United States Patent [19]

Tanner et al.

[11] Patent Number: 4,988,546
[45] Date of Patent: Jan. 29, 1991

[54] FLAVOR/FRAGRANCE ENHANCED COMPOSITE STRUCTURES

[75] Inventors: Cynthia L. Tanner; Allan A. Whillock, both of Mobile, Ala.

[73] Assignee: International Paper Company, Purchase, N.Y.

[21] Appl. No.: 207,859

[22] Filed: Jun. 17, 1988

[51] Int. Cl.$^5$ .............................................. B27N 5/00
[52] U.S. Cl. .................................. 428/34.2; 428/336; 428/345; 428/349; 428/412; 428/476.3; 428/483; 428/511; 428/526; 428/537.5
[58] Field of Search ..................... 428/34.2, 336, 345, 428/349, 511, 516, 537.5, 412, 476.3, 483

[56] References Cited

U.S. PATENT DOCUMENTS 3,620,435 11/1971 Sogi .................................. 229/3.5 R
3,882,259 5/1975 Nohara et al. ...................... 428/3 J
3,972,467 8/1976 Whillock et al. .................. 428/21 J Primary Examiner—Edith Buffalow
Attorney, Agent, or Firm—Walt Thomas Zielinski; Stewart L. Gitler

[57] ABSTRACT

The present invention relates to an improved container for food and non-food products. The container utilizes a novel combination of materials to overcome polymer odor-emission problems that detract from the packaged product. The novel material structure includes a polymer flavor/fragrance concentrate which imparts an enhanced fragrance to the product when the container is opened, increasing consumer appeal.

24 Claims, 1 Drawing Sheet

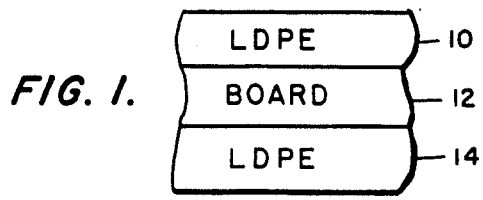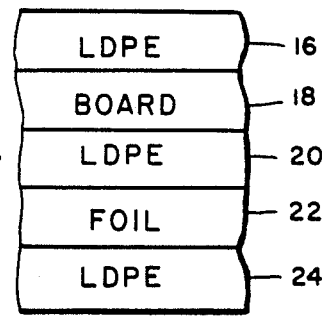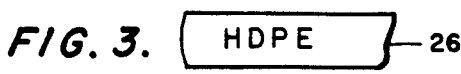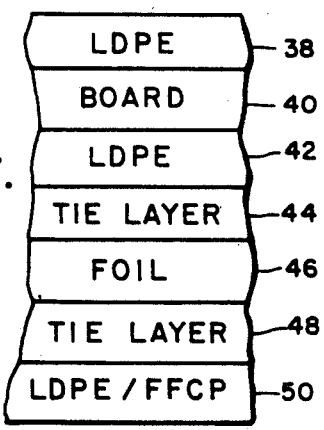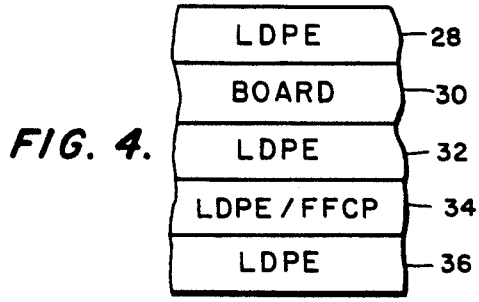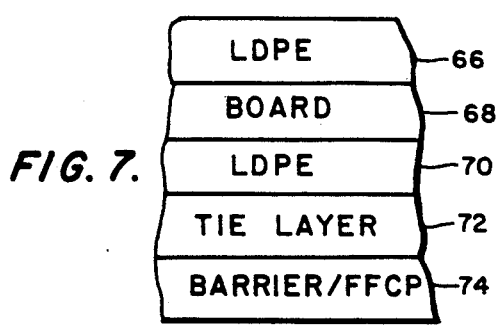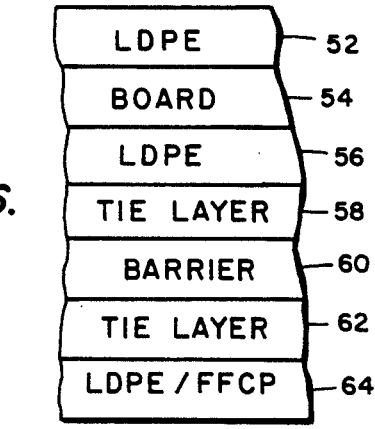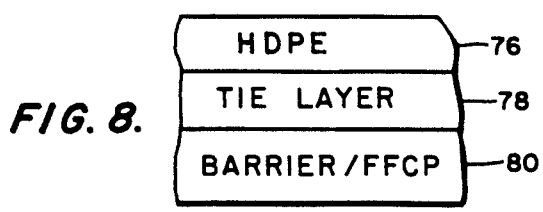

FLAVOR/FRAGRANCE ENHANCED COMPOSITE STRUCTURES

BACKGROUND OF THE INVENTION

The present invention relates to novel container, side-seamed blank, and laminate structures which contain flavor/fragrance concentrates. More particularly, this invention relates to laminate structures, extruded or molded, which contain specific polymeric carriers having high load levels of flavors or fragrances which effectively address the problem of unwanted odor emissions from polymers, and effectively enhance the aroma of the packaged liquid or solid, food or nonfood product by enhancing the aroma of its container.

Various structures have been utilized to store liquid or solid, food or non-food, products. A widely known and used container is a paperboard based structure which is coated with various barrier and sealant materials. One basic structure is utilized in the half-gallon juice carton. This structure makes use of a three-layer laminate wall structure. The laminate comprises a paperboard substrate coated on both sides by a layer of low density polyethylene. A second widely known structure makes use of a five-layer laminate wall structure. The half-gallon container laminate is comprised of a paperboard substrate, a layer of low density polyethylene coated on the exterior atmosphere-contact side of the substrate, a layer of a barrier material, such as aluminum foil, laminated onto the interior product-contact side of the substrate with a polymer layer of low density polyethylene, and a third layer of low density polyethylene coated onto the foil layer rendering the structure heat-sealable from front to back. Adhesive tie layers, such as ethylene-acrylic acid copolymers, have also been used in the structure to better secure the foil layer in the structure. In addition, various other barrier materials have been utilized to combat the transfer of various gases, light, and flavors into and out of the container.

The outer atmosphere-contact and inner food contact layers, whether merely a heat sealable polymer material such as low density polyethylene (LDPE) or a heat-sealable barrier material such as an ethylene vinyl alcohol copolymer (EVOH), can emit unwanted odors when heat is applied during extrusion coating or package converting/sealing. These odors can detract from the packaged product's organoleptic appeal.

A second popular container used to store liquid or solid, food or non-food products is a high density polyethylene (plastic) container. The half-gallon size container is constructed of high density polyethylene (HDPE) with a 21 mil. average wall thickness. The molding processes which are involved in producing such containers can often initiate degradation (oxidation) of the HDPE, causing the emission of unwanted odors which can be detrimental to the packaged product.

Consequently, in both plastic containers and/or existing commercial structures for paperboard cartons for liquid and solid, food and non food products odor-emission problems can occur as a result of thermal degradation of polymers. These odors detract from the packaged product.

An object of the present invention is to overcome the deficiencies of the conventional paperboard container and blow-molded thermoplastic container by incorporating into the product-contact layer, unique flavor/fragrance concentrates which enhance the aroma of the packaged product through enhancement of the aroma of its container.

Another object of the present invention is to provide flavor/fragrance concentrate product enhancement for all sizes and types of liquid or solid, food or non-food containers including four-ounce to 128-ounce paperboard or plastic containers, as required by the packager to improve the market appeal of the product.

A further object of this invention is to incorporate a flavor/fragrance concentrate polymeric carrier into a paperboard or plastic container alone or along with a barrier material such as an aluminum foil, polyethylene terephthalate, glycol-modified PET, acid-modified PET, ethylene vinyl alcohol copolymer, polyvinyl alcohol, polybutylene terephthalate, vinylidene chloride copolymer, polyvinyl chloride polymer, vinyl chloride copolymer, polyamide polymer, polyamide copolymer or polycarbonate polymer.

SUMMARY OF THE INVENTION

The preferred embodiment of the present invention reveals the use of flavor/fragrance concentrates in the product-contact or other buried polymeric layers of foil and non-foil, food and non-food, liquid or solid container composite structures to impart an enhanced fragrance when gable-top cartons or other type containers made from various structures are opened to dispense the product.

A laminate, side-seamed blank or container embodying the attributes of the invention can be produced by coating thereon as the product-contact other buried polymeric layer, a blend of a polymer flavor/fragrance concentrate and a virgin low density polyethylene or a blend of a polymer flavor/fragrance concentrate and a barrier polymer onto a multi-layer paperboard laminate structure or into high density polyethylene container.

The cartons, side-seamed blanks, or containers which contain the blend polymer layer produce a container which overcomes the problem of unwanted odors emitted by packaging materials, and which imparts an enhanced fragrance to the product when the container is opened, increasing consumer appeal. In addition, during the flavor/fragrance concentrate polymer LDPE blend's incorporation into paperboard laminate structures, the laminate retains the desirable feature of heat-sealability from front to back, with its exterior and interior layers being like, non polar constituents (LDPE-LDPE/FFCP) or polar/non-polar materials which can be heat-sealed.

BRIEF DESCRIPTION OF THE DRAWINGS

FIG. 1 is a cross sectional elevation of an existing commercial structure of a laminate;

FIG. 2 is a cross-sectional elevation of an existing commercial structure of a laminate;

FIG. 3 is a cross-sectional elevation of an existing commercial structure of a plastic jug;

FIG. 4 is a cross sectional elevation of a preferred embodiment of the present invention;

FIG. 5 is a cross-sectional elevation of an alternate preferred embodiment of the present invention;

FIG. 6 is a cross-sectional elevation of an alternate preferred embodiment of the present invention;

FIG. 7 is a cross-sectional elevation of an alternate preferred embodiment of the present invention;

FIG. 8 is a cross-sectional elevation of an alternate preferred embodiment of the present invention; and FIG. 9 is a cross-sectional elevation of an alternate preferred embodiment of the present invention.

DETAILED DESCRIPTION OF THE INVENTION

Turning now to the drawings, FIGS. 1, 2 and 3 depict wall section structures of conventional container structures.

FIG. 1 depicts a conventional paperboard laminate structure wherein a paperboard substrate 12 is sandwiched between layers 10 and 12 of heat-sealable low density polyethylene via the process of extrusion coating.

FIG. 2 depicts a five-layer conventional paperboard laminate structure comprising a paperboard substrate 18 coated on its exterior side with a layer of low density polyethylene 16. On the interior side of the substrate 18 laminated thereon is a layer of foil 22 coupled with a layer of low density polyethylene 20. Layer 24 is coated onto the foil layer 22 rendering the structure heat-sealable from front to back. Layers 10, 14, 16 and 24 of the two figures can emit unwanted odors which detract from the packaged product.

In a standard paperboard based half-gallon (or other size) juice carton, product fragrance or aroma is affected by the polymer odor emission problem and the perceived quality of the juice product is diminished.

FIG. 3 depicts a wall cross-section of a conventional blow-molded thermoplastic container. The container essentially comprises one thick layer of high density polyethylene 26 (average thickness is 21 mil). A similar problem arises in the blow-molded structure in that aroma or fragrance of the contained product is altered due to polymer odor emission and, as a result, the quality of the packaged product (e.g. orange juice) is perceived to be diminished.

FIGS. 4-9 illustrate six embodiments of the present invention, wherein a flavor/fragrance concentrate polymer (FFCP) is incorporated into the product-contact layer or into a buried layer in the structure.

The flavor/fragrance concentrate is FDA approved for food contact The flavor/fragrance concentrate is blended, as required, with FDA approved food contact polymers. The blend allows the concentrate to be heat sealed with other polymer layers in paperboard or other similar applications and allows the concentrate to be combined with high density polyethylene in blow molded thermoplastic applications.

Referring to FIG. 4, a broad and generalized depiction of a laminate structure which would incorporate a flavor/fragrance concentrate into a non-foil structure.

A paperboard substrate 30, which in half-gallon applications is 282-lb.-per-3000-square-feet board, is coated on its exterior with a 0.8 mil. layer 28 of a low density polyethylene polymer. An interior 1.1 mil. layer 32 of a low density polyethylene polymer is coated onto the interior of the substrate 30, coated thereon is a 0.4 mil. thick blend layer 34 of a low density polyethylene polymer and a flavor/fragrance concentrate polymer, and finally coated onto the blend layer is a 0.5 mil. layer 36 of a low density polyethylene polymer as the product contact layer. Layers 32, 34 and 36 are typically coextrusion coated together.

In this embodiment (FIG. 4), the flavor/fragrance concentrate - LDPE layer is (co)extrusion coated at a lower temperature than the product-contact layer, providing greater thermal protection to the FFCP. The sandwiched FFCP-LDPE blend layer also permits a controlled or retarded release of the fragrance component, which can be a significant advantage for products/packages with long shelf lives.

Referring to FIG. 5, a broad and generalized depiction of a laminate structure which would incorporate a flavor/fragrance concentrate.

A paperboard substrate 40, which in half-gallon applications is 282-lb -per-3000-square-feet carton board, is coated on its exterior with a 0.8 mil. layer 38 of a low density polyethylene polymer. An interior layer 42 of a low density polyethylene polymer and a layer 44 of a tie-layer polymer are coextrusion coated together with the low density polyethylene (0.5 mil.) contacting the paperboard substrate and the tie-layer polymer (0.3 mil.) contacting the aluminum foil (0.35 mil ) barrier layer 46. Coextrusion coated onto the foil is a layer 48 of tie-layer polymer (0.3 mil.) and the product-contact layer 50 of a low density polyethylene polymer (2.1 mil.) incorporating polymer flavor/ fragrance concentrate.

Tie layer materials such as ionomers, ethylene acrylic acid copolymers, or ethylene-methacrylic acid copolymers are all suitable for the structure.

FIG. 6 depicts a wall cross-section of a conventional barrier paperboard structure, one of which is depicted in FIG. 2, wherein the product-contact layer is a blend of a low density polyethylene polymer and a polymer flavor/ fragrance concentrate.

A paperboard substrate 54 is coated on both sides with layers (52) and (56) of a low density polyethylene polymer. On the carton interior side of the coated substrate a coextrusion coating is applied consisting of a tie-layer polymer (58) a barrier polymer layer (60) and a tie-layer polymer (62), and to complete the structure, a product-contact coating (64) of a blend of a low density polyethylene polymer and a polymer flavor/fragrance concentrate is applied.

Some materials which can function to meet the requisite barrier properties desired are foil, ethylene vinyl alcohol copolymer, polyethylene terephthalate, glycol-modified polyethylene terephthalate, acid modified polyethylene terephthalate, polybutylene terephthalate, polyvinyl alcohol, vinylidene chloride copolymer, polyvinyl chloride polymer, vinyl chloride copolymer, polyamide polymer, polyamide copolymer and polycarbonate polymer.

Other materials which can be extruded or laminated into a board laminate structure, which can provide the desired results, could also be utilized to practice the invention.

FIG. 7 depicts an alternate embodiment of the present invention for a paperboard laminate structure wherein the structure has as its product-contact layer a blend of the barrier material and the polymer flavor/-fragrance concentrate.

A paperboard substrate 68 is coated on its exterior side with a layer 66 of a low density polyethylene polymer. Coextrusion coated onto the interior side of the paperboard substrate is a second layer 70 of a low density polyethylene polymer, a tie-layer 72 which facilitates adhesion between layers, and a product contact layer 74 composed of a blend of a barrier material and a polymer flavor/fragrance concentrate.

The barrier material can be selected from the group consisting of ethylene vinyl alcohol copolymer, polyethylene terephthalate, glycol-modified polyethylene terephthalate, acid-modified polyethylene terephthalate, polybutylene terephthalate, polyvinyl alcohol, vinylidene chloride copolymer, polyvinyl chloride polymer, vinyl chloride copolymer, polyamide polymer, polyamide copolymer and polycarbonate polymer.

FIG. 8 depicts a wall cross-section of a conventional blow-molded thermoplastic container wherein a product-contact layer 80 of a blend of a barrier material and a polymer flavor/fragrance concentrate is combined high density polyethylene polymer substrate layer 76 by a tie layer 78.

A preferable polymer barrier material is ethylene vinyl alcohol copolymer, although polyethylene terephthalate glycol-modified polyethylene terephthalate, acid-modified polyethylene terephthalate, polybutylene terephthalate, polyvinyl alcohol, vinylidene chloride copolymer, polyvinyl chloride polymer, vinyl chloride copolymer, polyamide polymer, polyamide copolymer and polycarbonate polymer are all acceptable.

FIG. 9 depicts a wall cross section of a blow-molded thermoplastic container wherein the high density polyethylene layer has blended therein a flavor/fragrance concentrate polymer 82.

The particular polymer flavor/fragrance concentrate selected or the amount utilized usually in the range of 0.25–2.0% is determined by the specific application. In a conventional half-gallon orange juice container, for example, an orange flavored concentrate is incorporated into the product-contact layer thereby enhancing the aroma/fragrance of the packaged orange juice each time the package is opened through uniform, controlled release of the fragrance throughout the life of the product. In addition, if one of the barrier polymers is present in the construction, the flavor of the packaged-product is protected by inhibiting absorption (scalping) of the flavor/fragrance ingredients of the product into the low density polyethylene polymer layers, and by inhibiting transmission of the flavor/fragrance ingredient into and through the polymer layers and the substrate.

The blend of the low density polyethylene polymer and polymer flavor/fragrance concentrate or barrier polymer material and polymer flavor/fragrance concentrate in situations where applicable (paperboard containers) will heat-seal with a layer of a low density polyethylene polymer on conventional equipment at temperatures ranging from 250° F. to 500° F.

The laminate structures embodying the invention can be constructed into side-seamed blanks which are suitable for placement on form-fill-seal machines.

In addition, the blanks themselves are constructed into containers which house the product (e.g gable-top containers, flat top containers, etc.).

The description of the preferred embodiments is meant to be illustrative of the scope and spirit of the invention. These preferred structures will make apparent other embodiments and examples, within the scope and spirit of the invention described herein. These other embodiments and examples, within the scope and spirit of this invention, are within contemplation of this invention. Therefore, the invention should only be limited by the appended claims.

What is claimed is:

1. A multi-layer laminate structure including a carrier layer of material imparting stiffness to the laminate, a layer of low density polyethylene provided on both sides of the carrier layer, the improvement comprising: a buried layer of a blend of a low density polyethylene polymer and a polymer flavor/fragrance concentrate and a product-contact layer of a low density polyethylene polymer which can be heat-sealed with the outer layer of low density polyethylene on conventional equipment at temperatures ranging from 250° F.–500° F. to enhance product aroma.

2. A multi-layer laminate structure as claimed in claim 1 wherein said polymer flavor/fragrance concentrate is 0.25–2.0 wt. percent of the blend layer.

3. A multi-layer side-seamed blank, said blank constructed from a laminate structure including a carrier layer of material imparting stiffness to the laminate, a layer of low density polyethylene provided on both sides of the carrier layer, the improvement comprising: a buried layer of a blend of low density polyethylene polymer and a polymer flavor/fragrance concentrate and a product-contact layer of low density polyethylene polymer which can be heat-sealed with the outer layer of low density polyethylene on conventional equipment at temperatures ranging from 250° F.–500° F. to enhance product aroma.

4. A multi-layer side-seamed blank as claimed in claim 3 wherein said polymer flavor/fragrance concentrate is 0.25–2.0 wt. percent of the blend layer.

5. A multi-layer container, said container constructed from a side-seamed blank, constructed from a laminate structure including a carrier layer of material imparting stiffness to the laminate, a layer of low density polyethylene provided on both sides of the carrier layer, the improvement comprising: a buried layer of a blend of low density polyethylene polymer and a polymer flavor/fragrance concentrate and a product-contact layer of low density polyethylene polymer which can be heat-sealed with the outer layer of low density polyethylene on conventional equipment at temperatures ranging from 250° F.–500° F. to enhance product aroma.

6. A multi-layer container structure as claimed in claim 5 wherein said polymer flavor/fragrance concentrate is 0.25–2.0 wt. percent of the blend layer.

7. A multi-layer laminate structure including a carrier layer of material imparting stiffness to the laminate, a layer of low density polyethylene provided on both sides of the carrier layer, a layer of a barrier material provided on the opposite side of the carrier layer sandwiched between tie layers, the improvement comprising: a product-contact layer of a blend of a low density polyethylene polymer and a polymer flavor/fragrance concentrate which can be heat-sealed with the outer layer of low density polyethylene on conventional equipment at temperatures ranging from 250° F.–500° F. to enhance product aroma.

8. A multi-layer laminate structure as claimed in claim 7 wherein said barrier material layer is foil, ethylene vinyl alcohol copolymer, polyethylene terephthalate glycol-modified polyethylene terephthalate, acid-modified polyethylene terephthalate, polybutylene terephthalate, polyvinyl alcohol, vinylidene chloride copolymer, polyvinyl chloride polymer, vinyl chloride copolymer, polyamide polymer, polyamide copolymer or polycarbonate polymer.

9. A multi-layer laminate structure as claimed in claim 7 wherein said polymer flavor/fragrance concentrate is 0.25–2.0 wt percent of the blend layer.

10. A multi-layer side-seamed blank, said blank constructed from a laminate structure including a carrier layer of material imparting stiffness to the laminate, a layer of low density polyethylene provided on both sides of the carrier layer, a layer of a barrier material provided on the opposite side of the carrier layer sandwiched between tie layers, the improvement comprising: a product-contact layer of a blend of a low density polyethylene polymer and a polymer flavor/fragrance concentrate which can be heat-sealed with the outer layer of low density polyethylene on conventional equipment at temperatures ranging from 250° F.–500° F. to enhance product aroma.

11. A multi-layer side-seamed blank as claimed in claim 10 wherein said barrier material layer is foil, ethylene vinyl alcohol copolymer, polyethylene terephthalate, glycol-modified polyethylene terephthalate, acid-modified polyethylene terephthalate, polybutylene terephthalate, polyvinyl alcohol, vinylidene chloride copolymer, polyvinyl chloride polymer, vinyl chloride copolymer, polyamide polymer, polyamide copolymer or polycarbonate polymer.

12. A multi-layer side-seamed blank as claimed in claim 10 wherein said polymer flavor/fragrance concentrate is 0.25–2.0 wt. percent of the blend layer.

13. A multi-layer container, said container constructed from a side seamed blank, constructed from a laminate structure including a carrier layer of material imparting stiffness to the laminate, a layer of low density polyethylene provided on both sides of the carrier layer, a layer of a barrier material provided on the opposite side of the carrier layer sandwiched between tie layers, the improvement comprising a product-contact layer of a blend of a low density polyethylene polymer and a polymer flavor/fragrance concentrate which can be heat-sealed with the outer layer of low density polyethylene on conventional equipment at temperatures ranging from 250° F.–500° F. to enhance product aroma.

14. A multi-layer container as claimed in claim 13 wherein said barrier material layer is foil, ethylene vinyl alcohol copolymer, polyethylene terephthalate, glycol-modified polyethylene terephthalate, acid-modified polyethylene terephthalate, polybutylene terephthalate, polyvinyl alcohol, vinylidene chloride copolymer, polyvinyl chloride polymer, vinyl chloride copolymer, polyamide polymer, polyamide copolymer or polycarbonate polymer.

15. A multi-layer container as claimed in claim 13 wherein said polymer flavor/fragrance concentrate is 0.25–2.0 wt. percent of the blend layer.

16. A multi-layer laminate structure including a carrier layer of material imparting stiffness to the laminate, a layer of low density polyethylene provided on one side of the carrier layer, a layer of a low density polyethylene polymer and a tie layer provided on the opposite side of the carrier layer, the improvement comprising: a product-contact layer of a blend of a barrier material and a polymer flavor/fragrance concentrate which can be heat sealed with the outer layer of low density polyethylene on conventional equipment at temperatures ranging from 250° F.–500° F. to enhance product aroma.

17. A multi-layer laminate structure as claimed in claim 16 wherein said barrier material layer is ethylene vinyl alcohol copolymer, polyethylene terephthalate, glycol-modified polyethylene terephthalate, acid-modified polyethylene terephthalate, polybutylene terephthalate, polyvinyl alcohol, vinylidene chloride copolymer, polyvinyl chloride polymer, vinyl chloride copolymer, polyamide polymer, polyamide copolymer or polycarbonate polymer.

18. A multi-layer laminate structure as claimed in claim 16 wherein said polymer flavor/fragrance concentrate is 0.25–2.0 wt. percent of the blend layer.

19. A multi-layer side-seamed blank, said blank constructed from a laminate structure including a carrier layer of material imparting stiffness to the laminated a layer of low density polyethylene provided on one side of the carrier layer, a layer of a low density polyethylene polymer and a tie layer provided on the opposite side of the carrier layer, the improvement comprising: a product-contact layer of a blend of a barrier material and a polymer flavor/fragrance concentrate which can be heat-sealed with the outer layer of low density polyethylene on conventional equipment at temperatures ranging from 250° F.–500° F. to enhance product aroma.

20. A multi-layer side-seamed blank structure as claimed in claim 19 wherein said barrier material layer is ethylene vinyl alcohol copolymer, polyethylene terephthalate, glycol-modified polyethylene terephthalate, acid-modified polyethylene terephthalate, polybutylene terephthalate, polyvinyl alcohol, vinylidene chloride copolymer, polyvinyl chloride polymer, vinyl chloride copolymer, polyamide polymer, polyamide copolymer or polycarbonate polymer.

21. A multi-layer side-seamed blank structure as claimed in claim 19 wherein said polymer flavor/fragrance concentrate is 0.25–2.0 wt. percent of the blend layer.

22. A multi-layer container, said container constructed from a side-seamed blank, constructed from a laminate structure including a carrier layer of material imparting stiffness to the laminate, a layer of low density polyethylene provided on one side of the carrier layer, a layer of a low density polyethylene polymer and a tie layer provided on the opposite side of the carrier layer, the improvement comprising: a product-contact layer of a blend of a barrier material and a polymer flavor/fragrance concentrate which can be heat-sealed with the outer layer of low density polyethylene on conventional equipment at temperatures ranging from 250° F.–500° F. to enhance product aroma.

23. A multi-layer container structure as claimed in claim 22 wherein said barrier material layer is ethylene vinyl alcohol copolymer, polyethylene terephthalate, glycol-modified polyethylene terephthalate, acid-modified polyethylene terephthalate, polybutylene terephthalate, polyvinyl alcohol, vinylidene chloride copolymer, polyvinyl chloride polymer, vinyl chloride copolymer, polyamide polymer, polyamide copolymer or polycarbonate.

24. A multi-layer container structure as claimed in claim 22 wherein said polymer flavor/fragrance concentrate is 0.25–2.0 wt. percent of the blend layer.

* * * * *